United States Patent
Xiao

(10) Patent No.: US 10,282,649 B2
(45) Date of Patent: May 7, 2019

(54) MACHINE RECOGNIZABLE PATTERN GENERATION

(71) Applicants: Empire Technology Development LLC, Wilmington, DE (US); Zhen Xiao, Beijing (CN)

(72) Inventor: Zhen Xiao, Beijing (CN)

(73) Assignee: Empire Technology Development, LLC, Wilmington, DE (US)

( * ) Notice: Subject to any disclaimer, the term of this patent is extended or adjusted under 35 U.S.C. 154(b) by 80 days.

(21) Appl. No.: 15/504,047

(22) PCT Filed: Aug. 19, 2014

(86) PCT No.: PCT/CN2014/084708
§ 371 (c)(1),
(2) Date: Feb. 15, 2017

(87) PCT Pub. No.: WO2016/026082
PCT Pub. Date: Feb. 25, 2016

(65) Prior Publication Data
US 2018/0240001 A1    Aug. 23, 2018

(51) Int. Cl.
*G06K 7/10*  (2006.01)
*G06K 19/06* (2006.01)
*G06K 7/12*  (2006.01)

(52) U.S. Cl.
CPC .......... *G06K 19/0614* (2013.01); *G06K 7/12* (2013.01); *G06K 19/06* (2013.01); *G06K 2019/06225* (2013.01)

(58) Field of Classification Search
CPC ... G06K 7/14; G06K 7/10851; G06K 7/10594

USPC ..................................... 235/462.01
See application file for complete search history.

(56) References Cited

U.S. PATENT DOCUMENTS

| | | | |
|---|---|---|---|
| 6,046,858 A | 4/2000 | Scott et al. | |
| 6,480,273 B1 * | 11/2002 | Brock | G01J 3/28 356/300 |
| 8,567,677 B1 | 10/2013 | Yap et al. | |
| 9,799,122 B2 * | 10/2017 | Komatsu | G06K 9/4661 |
| 2005/0150964 A1 | 7/2005 | Lo | |
| 2010/0104260 A1 | 4/2010 | Yoon et al. | |
| 2011/0089241 A1 | 4/2011 | Medintz et al. | |

(Continued)

FOREIGN PATENT DOCUMENTS

| CN | 101689013 A | 3/2010 |
|---|---|---|
| CN | 102317951 | 1/2012 |

(Continued)

OTHER PUBLICATIONS

Butala, R M., et al., "Metameric Modulation for Diffuse Visible Light Communications with Constant Ambient Lighting," MCL Technical Report No. Oct. 22, 2012, pp. 1-7 (Oct. 22, 2012).

(Continued)

*Primary Examiner* — Ahshik Kim

(57) ABSTRACT

When the intensity of visible light is properly modulated, the difference between the modulated visible light and the original visible light is not noticeable to human eyes but detectable to electronic devices. Thus, the modulated visible light may be utilized to form patterns that are only recognizable to electronic devices but not to human eyes.

23 Claims, 7 Drawing Sheets

(56) References Cited

U.S. PATENT DOCUMENTS

| | | |
|---|---|---|
| 2013/0063704 A1 | 3/2013 | Hu et al. |
| 2013/0153651 A1 | 6/2013 | Fedorovskaya et al. |
| 2017/0201326 A1* | 7/2017 | Philipson ........... H04B 10/5563 |
| 2018/0007343 A1* | 1/2018 | Send ....................... G01S 17/46 |

FOREIGN PATENT DOCUMENTS

| | | |
|---|---|---|
| JP | 2008165517 A | 7/2008 |
| WO | 2009147874 A1 | 12/2009 |

OTHER PUBLICATIONS

International Search Report and Written Opinion for International Application No. PCT/CN2014/084708 dated May 29, 2015, 11 Pages.

"Metamerism (color)," Wikipedia, accessed at https://web.archive.org/web/20140714182531/http://en.wikipedia.org/wiki/Metamerism_(color), last modified on Jan. 27, 2014, 3 Pages.

* cited by examiner

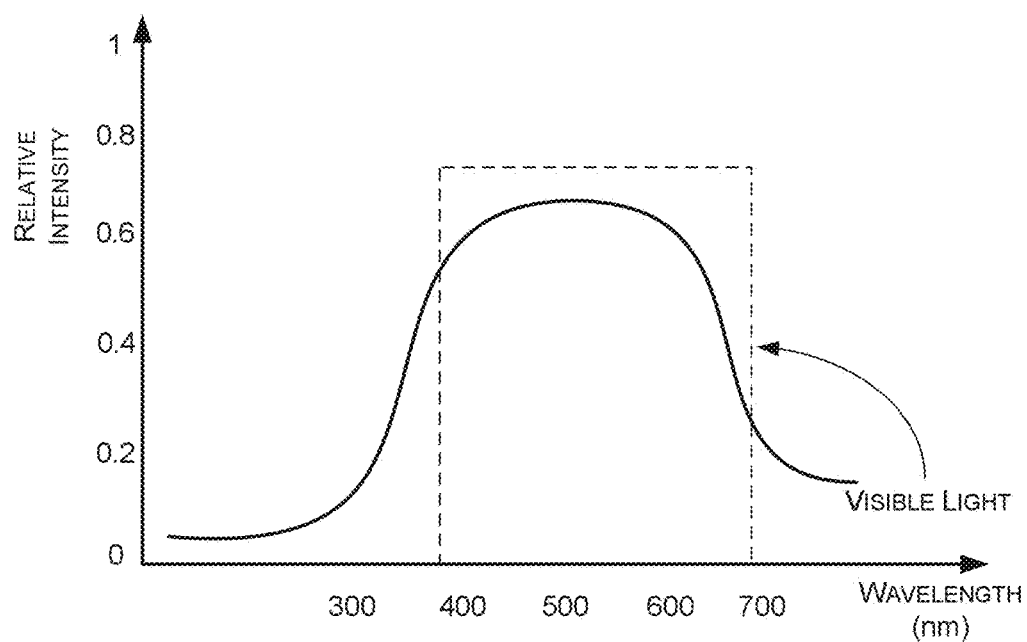
FIG. 1A
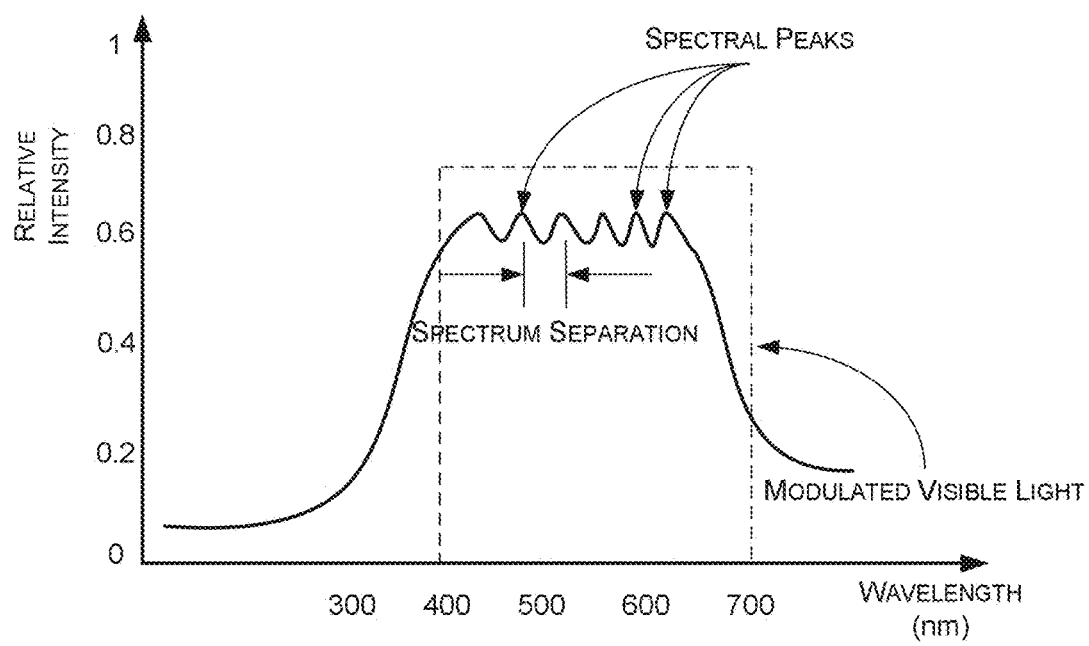
FIG. 1B
FIG. 1

MACHINE RECOGNIZABLE PATTERN GENERATION

TECHNICAL FIELD

The technologies described herein pertain generally to the generation of machine recognizable patterns that are formed by modulated light.

CROSS-REFERENCE TO RELATED APPLICATION

The present application is a U.S. National Stage Application under 35 U.S.C. § 371 of International Application Serial No. PCT/CN2014/084708, filed on Aug. 19, 2014, the content of which are incorporated herein by reference in its entirety.

BACKGROUND

Unless otherwise indicated herein, the approaches described in the section are not prior art to the claims in this application and are not admitted to be prior art by inclusion in this section.

Due to differences in fonts, styles, or other variants, not all text can be easily recognized by electronic devices. Machine recognizable patterns, such as barcode and Quick Response (QR) code, have been developed to provide features with better contrast and, thus, may be quickly recognized by electronic devices. Such machine recognizable patterns have been utilized in many aspects of daily life to embed information recognizable to electronic devices.

SUMMARY

Technologies are generally described for generating machine recognizable patterns. The various techniques described herein may be implemented in various systems, methods, computer readable mediums, and/or computer programmable products.

In some examples, various embodiments may be implemented as devices. Some devices may include a light source configured to emit visible light; and a light intensity modulator configured to modulate intensities of the visible light at one or more wavelengths positioned within at least a portion of a spectrum of the visible light, wherein a variation between consecutive wavelengths is less than a predetermined threshold value.

In some examples, various embodiments may be implemented as methods. Some methods may include generating visible light; selecting one or more wavelengths within at least a portion of a spectrum of the visible light, wherein a variation between consecutive wavelengths is less than a predetermined threshold value; modulating intensities of the visible light at the one or more selected wavelengths; and forming a pattern with the modulated visible light.

In some examples, various embodiments may be implemented as non-transitory computer-readable medium, hosted by a service provider, that stores instructions that, when executed, cause one or more processors to perform operations including generating visible backlight for multiple pixels; and selecting one or more of the multiple pixels to form a pattern, wherein the one or more selected pixels are coated with multiple films to modulate intensities at one or more wavelengths.

In some examples, other non-transitory computer-readable mediums may store instructions that, when executed, cause one or more processors to perform operations including generating visible light; selecting one or more wavelengths within at least a portion of a spectrum of the visible light, wherein a variation between consecutive wavelengths is less than a predetermined threshold value; modulating intensities of the visible light at the one or more selected wavelengths; and forming a pattern with the modulated visible light, wherein the pattern is invisible to human eyes.

In some examples, other methods may include generating visible light; spectrally modulating the visible light to create modulated visible light, the modulated visible light having a spectral modulation, the spectral modulation including a variation of intensity as a function of wavelength; and displaying an image using the modulated visible light, wherein the machine recognizable pattern is encoded in the image by the spectral modulation, and the spectral modulation is imperceptible to a human viewer of the image.

In some examples, other methods may include filtering image light from the image using an image spectral filter to provide filtered image light; and detecting the machine recognizable pattern in the filtered image light using an electronic imaging device, wherein detecting the machine recognizable pattern comprises detecting one or more spectral peaks or spectral troughs in the filtered image light, wherein the machine recognizable pattern is encoded in the image light by a spectral modulation, the spectral modulation including a variation of intensity as a function of wavelength.

In some examples, other systems may include a light source configured to emit light; a light intensity modulator configured to produce a spectral modulation of the light that passes through the light intensity modulator, wherein the spectral modulation includes a variation of light intensity as a function of wavelength; and a display device, configured to display the image using the light that passes through the light intensity modulator, wherein the machine recognizable pattern is encoded in the image by the spectral modulation, and the spectral modulation is not perceptible in the image by human vision.

In some examples, other systems may include a light source configured to emit light; a light intensity modulator configured to create modulated light when the light passes through the light intensity modulator, wherein the modulated light has a spectral modulation, and the spectral modulation includes an intensity modulation as a function of wavelength of the modulated light; a display device, configured to display an image using the modulated light; and an electronic imaging device, configured to detect the machine recognizable pattern in the image based on the spectral modulation, wherein the spectral modulation is not perceptible to a human viewer of the display device.

In some examples, other systems may include an image spectral filter, configured to receive image light from the image and provide filtered image light; and an optical sensor, configured to receive the filtered image light from the image spectral filter, and to generate sensor signals in response to the filtered image light; and an image sensor analysis circuit, configured to receive the sensor signals, and to detect the machine recognizable pattern in the image based on the sensor signals, wherein the machine recognizable pattern is a spectral modulation in the image light, the optical image filter is configured to enhance the spectral modulation in the filtered image light, and the spectral modulation is not perceptible to a human viewer of the image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings:

FIG. 1A shows an example of visible light that may be utilized to generate machine recognizable patterns; FIG. 1B shows an example of modulated visible light that may be utilized to generate machine recognizable patterns;

DETAILED DESCRIPTION

Figure 2:
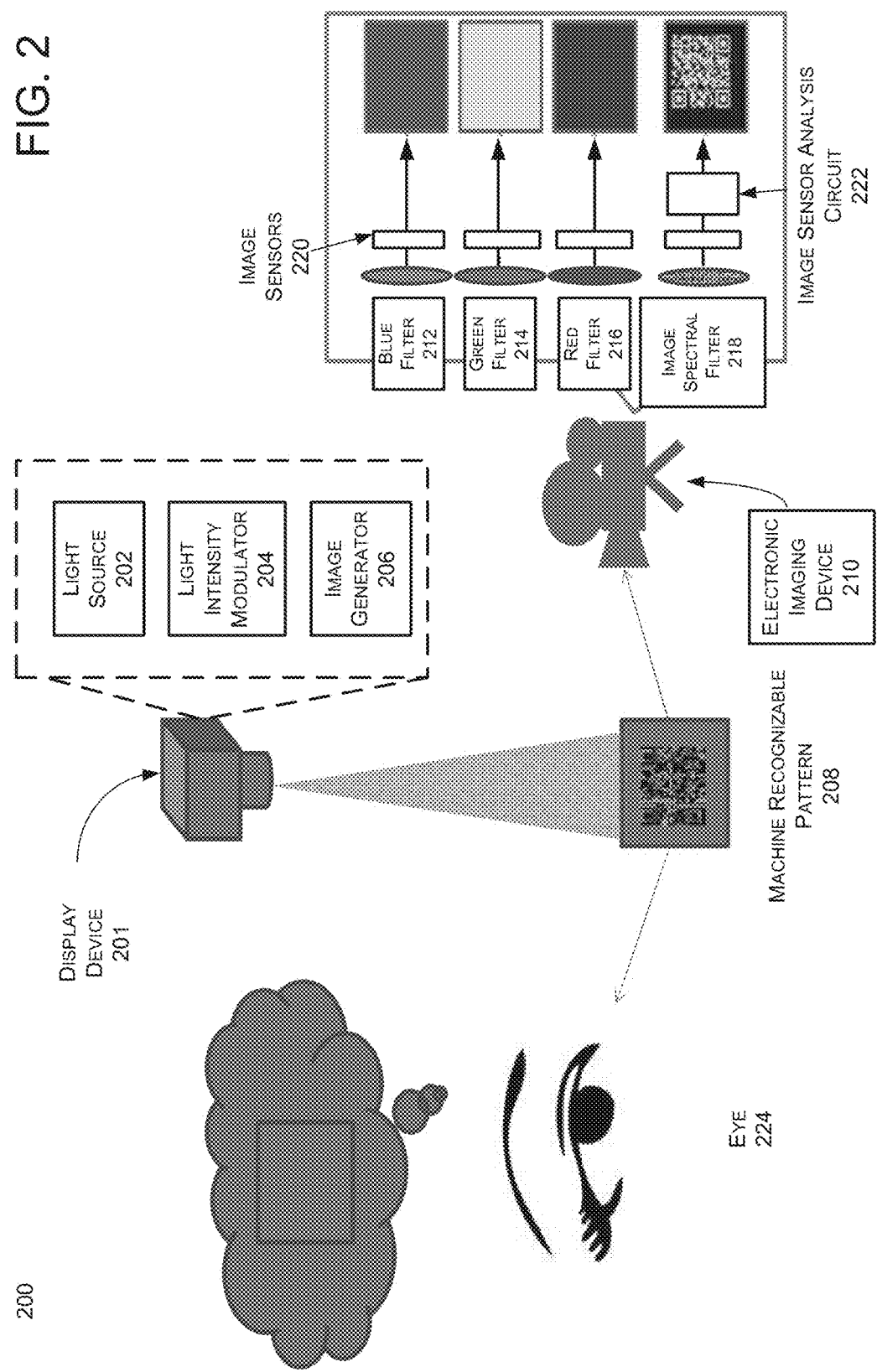
FIG. 2 shows an example system by which machine recognizable patterns may be generated and detected.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Briefly stated, visible light may be converted into light that may be detected only by electronic devices. The intensity of the visible light may be spectrally modulated, provided that the electronic devices are properly configured to capture the modulated light. The modulated light may then be utilized to form patterns that are recognizable to only the properly configured electronic devices. In other examples, the modulated light may be utilized for light fidelity ("Li-Fi") technology to provide different frequency resources for different communication devices.

As referenced herein, "anti-reflective film" may refer to a type of optical coating applied to the surface of lenses or other optical components to reduce reflection and, thus, to enhance refraction. The intensity of light of a given wavelength that passes through the anti-reflective film may be enhanced by selecting the thickness of the anti-reflective film.

Similarly, as referenced herein, "anti-refractive film" may refer to another type of optical coating applied to the surface of lenses or other optical components to reduce refraction and to enhance reflection. The intensity of light of a given wavelength that passes through the anti-refractive film may be reduced by selecting the thickness of the anti-refractive film.

"Flat panel display," as referenced herein, may refer to electronic visual display devices that include, at least of, a liquid crystal display (LCD), a light emitting diode (LED) display, an organic light-emitting diode (OLED) display, a plasma screen, etc.

"LED display board," as referenced herein, may refer to electronic visual display devices that include an array of LED diodes that correspond to multiple pixels to construct a digital image. Each pixel of an LED display board may include one or more LED diodes that may be independently controlled by an IC chip or a processor.

"Light box," as referenced herein, may refer to a flat box, with sides made of translucent glass or plastic, that house an electric light, so as to provide an evenly lighted flat surface or even illumination, in settings such as an art or photography studio.

FIG. 1A shows an example of visible light that may be utilized to generate machine recognizable patterns; FIG. 1B shows an example of modulated visible light that may be utilized to generate machine recognizable patterns, all arranged in accordance with at least some embodiments described herein. As depicted, FIG. 1A shows an example graph that indicates the correlation between wavelength and relative intensity of visible light, and FIG. 1B shows an example graph that indicates the correlation between wavelength and relative intensity of the modulated visible light.

With respect to FIG. 1A, the horizontal axis indicates the spectrum of visible light, e.g., wavelengths, roughly within a spectrum between 390 nm and 700 nm. That is, light of a wavelength within the spectrum may be visible to human eyes. The vertical axis of FIG. 1A indicates the normalized intensity of the visible light. That is, the intensity of the visible light is proportionately adjusted into a scale from 0 to 1.

In some examples, the intensity of the visible light may be enhanced or reduced ("modulated" hereafter) at a given wavelength by coating a lens, which may be coupled to a light source, with anti-reflective film (and/or anti-refractive film). The thickness of the anti-reflective film and/or anti-refractive film may be determined by the given wavelength in accordance with laws of optics. For example, when the intensity of the visible light at 400 nm is to be enhanced, the thickness of the anti-reflective film may be set as 400/4n nm (n represents the refractive index of the anti-reflective film). Similarly, the intensity of the visible light at 400 nm may be reduced if an anti-refractive film of proper thickness is coated on the lens. By applying multiple layers of anti-reflective and/or anti-refractive film on the lens, the visible light passing through the lens may be further modulated at multiple intended wavelengths corresponding to the thicknesses of the films.

The intensity of the visible light may be modulated at multiple wavelengths, e.g., 400 nm, 450 nm, 500 nm, 550 nm, and 600 nm, to an extent that the modulated visible light may be distinguishable by electronic devices but perceived as normal visible light by human eyes. For example, at each of the multiple wavelengths, a spectral peak may be created due to the enhanced intensity or due to attenuation of adjacent wavelengths. When two neighboring spectral peaks are close enough to each other, e.g., the spectrum separation between two neighboring spectral peaks being less than 60 nm, human eyes are unable to detect the difference between the visible light and the modulated visible light. Example modulated visible light depicted in FIG. 1B is perceived as white light, the same as the visible light depicted in FIG. 1A, to human eyes. In at least some other examples, monochromatic light, e.g., red light, blue light, etc., may be similarly modulated. Such modulated monochromatic light may be perceived by human eyes as being normal monochromatic light as long as the two neighboring peaks are sufficiently close to each other as described above.

In the examples described in accordance with the following figures, the modulated visible light, either white light or monochromatic light, may be utilized to form patterns that may be perceived or recognized by machines but not by human eyes. The detection of such patterns is described in greater detail below.

FIG. 2 shows an example system 200 by which machine recognizable patterns may be generated and detected, all arranged in accordance with at least some embodiments described herein. As depicted, example system 200 may include, at least, a display device 201 to display a machine recognizable pattern 208 that may be detected by an electronic imaging device 210 but not by human eye 224. Display device 201 may include a light source 202, a light intensity modulator 204, and an image generator 206. Electronic imaging device 210 may include a blue filter 212, a green filter 214, a red filter 216, an image spectral filter 218, one or more image sensors 220, and an image sensor analysis circuit 222. Eye 224 may refer to a human eye.

Display device 201 may refer to a device configured to generate machine recognizable pattern 208 with modulated visible light. Non-limiting examples of display device 201 may include flat panel displays, projectors, light emitting diode (LED) display boards, etc.

Light source 202 may refer to a component, integrated in display device 201, that may be configured to generate visible light. In different examples of display device 201, light source 201 may refer to one or more backlights in flat panel displays, one or more light bulbs in projectors, and one or more LEDs in an LED display board. As stated above, light source 201 may alternatively be configured to generate monochromatic light, such as red light, blue light, green light, etc. The generated visible light may be directed to light intensity modulator 204.

Light intensity modulator 204 may refer to one or more layers of transparent film applied to a transparent material. As described in accordance with FIGS. 1A and 1B, light intensity modulator 204 may refer to one or more layers of anti-reflective and/or anti-refractive film applied to a lens coupled to light source 202. Different embodiments of light intensity modulator 204 in different embodiments of display device 201 are described below.

In an example in which display device 201 is implemented as a projector, light intensity modulator 204 may refer to a sector on a color wheel of the projector on which layers of anti-reflective and/or anti-refractive film may be applied. Thus, the projector may display machine recognizable pattern 208 that is not perceivable by human eyes but recognizable by machines. The color wheel of the projector is described in greater detail in accordance with FIG. 3.

In an example in which display device 201 is implemented as a flat panel display, e.g., a LCD monitor, light intensity modulator 204 may refer to an additional subpixel that may be added to the conventional three subpixels, i.e., red, green, and blue, of a pixel. The additional subpixel may have the layers of the anti-reflective and/or anti-refractive film applied thereto to modulate the visible light received from light source 202. Similar to the conventional three subpixels, the additional subpixel may be controlled by a processor or a LCD driver chip to adjust the amount of refracted light. Thus, the flat panel display may display machine recognizable pattern 208 that is not perceivable by human eyes but recognizable by machines. An array of the additional subpixels to generate machine recognizable pattern 208 is described in greater detail in accordance with FIG. 4.

In an example in which display device 201 is implemented as an LED display board that includes an array of multiple LEDs, light intensity modulator 204 may refer to the multiple anti-reflective and/or anti-refractive films coated on at least some of the multiple LEDs. By controlling the on-and-off status of the at least some of the multiple LEDs, machine recognizable pattern 208 may be generated.

In an example in which display device 201 refers to a light box, light intensity modulator 204 may refer to the multiple layers of anti-reflective and/or anti-refractive film printed on a pane of glass of the light box to generate machine recognizable pattern 208.

Image generator 206 may refer to a component, integrated in display device 201, that may be configured to receive modulated visible light from light intensity modulator 204 and to form machine recognizable pattern 208. In an example in which display device 201 is a projector, image generator 206 may refer to a combination of a lens and a control IC chip, e.g., Digital Micromirror Device (DMD) chip. The combination of the lens and the control IC chip may be configured to direct the monochromatic light, e.g., red, green, and blue, to positions on a screen to generate color images. Similarly, the combination of the lens and the control IC chip may be configured to direct the modulated visible light to one or more positions on the screen and to generate machine recognizable pattern 208.

Machine recognizable pattern 208 may refer to a graphical pattern, formed by the modulated visible light, which is not recognizable to human eye 224. Non-limiting examples of machine recognizable pattern 208 may include a barcode, a quick response (QR) code, textual material, etc. In at least some examples, machine recognizable pattern 208 may be projected or otherwise displayed overlapping other images or videos. In an advertising example, machine recognizable pattern 208, e.g., a barcode, may be displayed overlapping or in an image of displayed apparel. Information embedded in the barcode may include information regarding the brand, the price, and/or the return policy of the winter coat. When a user utilizes electronic imaging device 210 to capture a picture of the winter coat, the barcode may be also captured by electronic image device 210. Such information may then be displayed on a display device for the user or stored as metadata of the picture of the winter coat.

Electronic imaging device 210 may refer to a device configured to capture an electronic image of machine recognizable pattern 208. Electronic image device 210 may include an array of sensing units, each of which may be configured to detect color information of a pixel of an image and/or machine recognizable pattern 208. Each sensing unit in the array may include a group of blue filter 212, green filter 214, and red filter 216 to capture color information. Additionally, each sensing unit may include image spectral filter 218 to detect machine recognizable pattern 208.

In each one of the array of sensing units, blue filter 212, green filter 214, and red filter 216 may respectively refer to a color filter configured to separate a color from light emitted from the images or videos that are overlapping with machine recognizable pattern 208. Thus, color information, e.g., luminance/intensity, of each color may be filtered and further collected by image sensors 220. In conventional digital image processing, such color information may be combined to construct a color image.

Image spectral filter 218 may refer to a filter coated with multiple layers of anti-reflective and/or anti-refractive film that, in at least some examples, are identical to the film on light intensity modulator 204. In some other examples, the spectrum separations between two neighboring spectral peaks modulated by image spectral filter 218 may be configured to be closer than those between spectral peaks modulated by light intensity modulator 204.

Image sensors 220 may refer to one or more devices configured to sense the respective intensity of the light via blue filter 212, green filter 214, red filter 216, and image spectral filter 218. The intensity may then be further digitized by image sensors 220 to generate a digital image.

Image sensor analysis circuit 222 may refer to a processor or a circuit configured to implement analysis algorithms to compare the intensity detected via image spectral filter 218 to the intensities detected via blue filter 212, green filter 214, and red filter 216. In accordance with the result of the comparison, image sensor analysis circuit 222 may determine whether the corresponding sensing unit receives the modulated visible light or normal visible light.

As a non-limiting example of such a comparison, the visible light may be modulated so that the intensity corresponding to wavelengths within 450 nm-500 nm, 550 nm-600 nm, and 650 nm-700 nm may be reduced to nearly zero; and the intensity corresponding to wavelengths within 400 nm-450 nm, 550 nm-550 nm, and 600-650 nm may be enhanced by nearly 1. Thus, the modulated visible light may be represented in a vector as (1, 0, 1, 0, 1, 0). Each element of the vector may represent the intensity corresponding to the wavelength ranges above, or other wavelength ranges. Presumably, the visible light may be represented as (0.5, 0.5, 0.5, 0.5, 0.5, 0.5), assuming the output power of light source 202 remains the same.

Since blue filter 212, green filter 214, red filter 216, and image spectral filter 218 are configured to only allow portions of the modulated visible light and the visible light to pass through, blue filter 212, green filter 214, red filter 216, and image spectral filter 218 may be represented as a matrix:

|  | Image spectral filter 218 | Blue filter 212 | Green filter 214 | Red filter 216 |
|---|---|---|---|---|
| 400-450 nm | 1 | 1 | 0 | 0 |
| 450-500 nm | 0 | 1 | 0 | 0 |
| 500-550 nm | 1 | 0 | 1 | 0 |
| 550-600 nm | 0 | 0 | 1 | 0 |
| 600-650 nm | 1 | 0 | 0 | 1 |
| 650-700 nm | 0 | 0 | 0 | 1 | in which each row represents one of the wavelength ranges mentioned above and each column represents one of the filters mentioned above. Thus, the visible light received at image sensors 220 may yield a vector (1.5, 1, 1, 1) and the modulated visible light received at image sensors 220 may yield a vector (3, 1, 1, 1). By comparing the two vectors, image sensor analysis circuit 222 may determine whether the corresponding sensing unit receives the modulated visible light or the normal visible light. Thus, the array of sensing units of electronic image device 210 may detect machine recognizable pattern 208.

Figure 3:
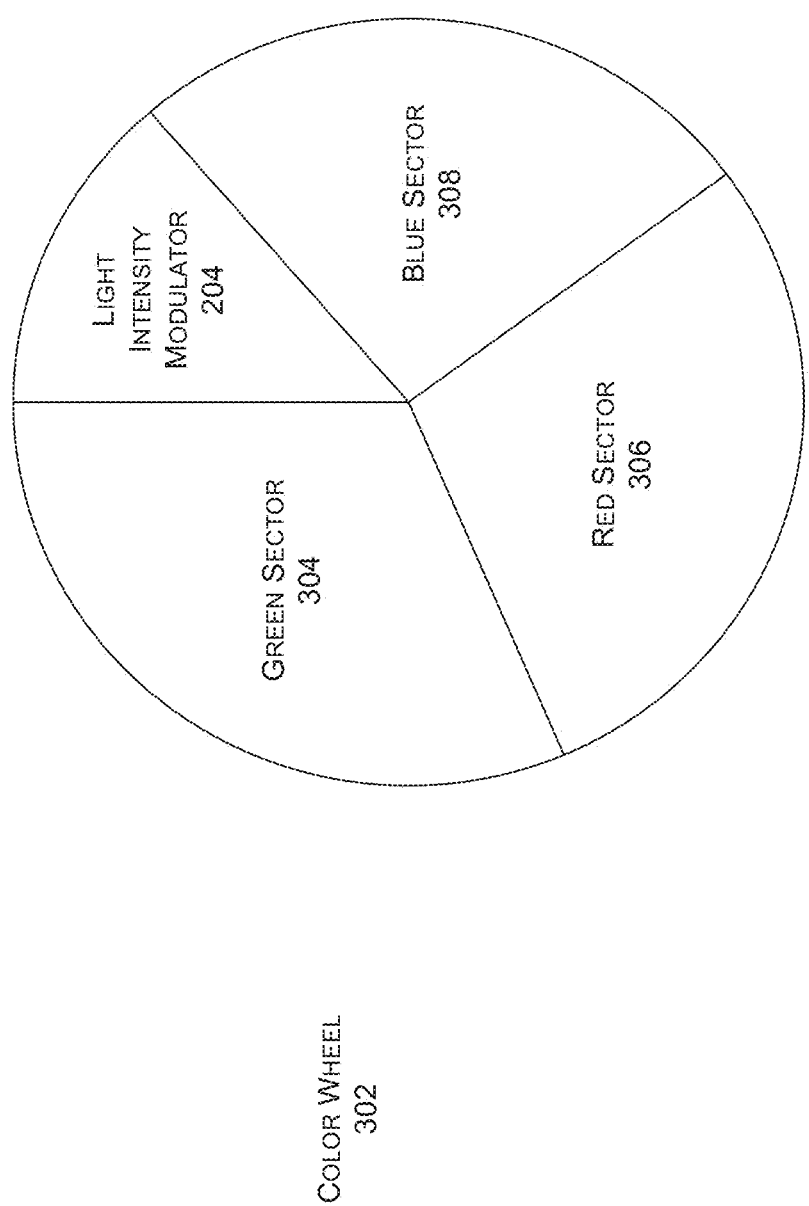
FIG. 3 shows an example device in which a light intensity modulator may be implemented for machine recognizable pattern generation.

FIG. 3 shows an example color wheel 302 in which a light intensity modulator may be implemented for machine recognizable pattern generation, all arranged in accordance with at least some embodiments described herein.

Color wheel 302 may refer to a component utilized in digital projection for dividing light from a light source into multiple colors and to modulate the light. As depicted, example color wheel 302 may include a green sector 304, a red sector 306, a blue sector 308, and light intensity modulator 204. In accordance with conventional color projection technologies, color wheel 302 may include other sectors such as cyan, magenta, yellow, etc. Briefly stated, when color wheel 302 spins, the different sectors of color wheel 302 may divide the visible light from light source 202 into multiple colors, which may be further combined on a screen to generate color images or videos. In addition, color wheel 302 may modulate the light from light source 202 with light intensity modulator 204.

Green sector 304 may refer to a sector of color wheel 302 that may be made of partially transparent material that only allows light of certain range of wavelength, i.e., green light, to pass through.

Similarly, red sector 306 may refer to another sector of color wheel 302 that may be made of partially transparent material that only allows light of another range of wavelength, i.e., red light, to pass through.

Again, similarly, blue sector 308 may refer to another sector of color wheel 302 that may be made of partially transparent material that only allows light of another certain range of wavelength, i.e., blue light, to pass through. The green light, red light, and blue light may be combined to generate images or videos on a display that may be perceived by human eyes.

Light intensity modulator 204 may refer to a sector of color wheel 302 that to which multiple layers of anti-reflective and/or anti-refractive film may be applied. When the visible light passes through light intensity modulator 204, the intensity of the visible light may be modulated at multiple given wavelengths. The modulated visible light may then be directed to positions on a screen to generate machine recognizable pattern 208.

Figure 4:
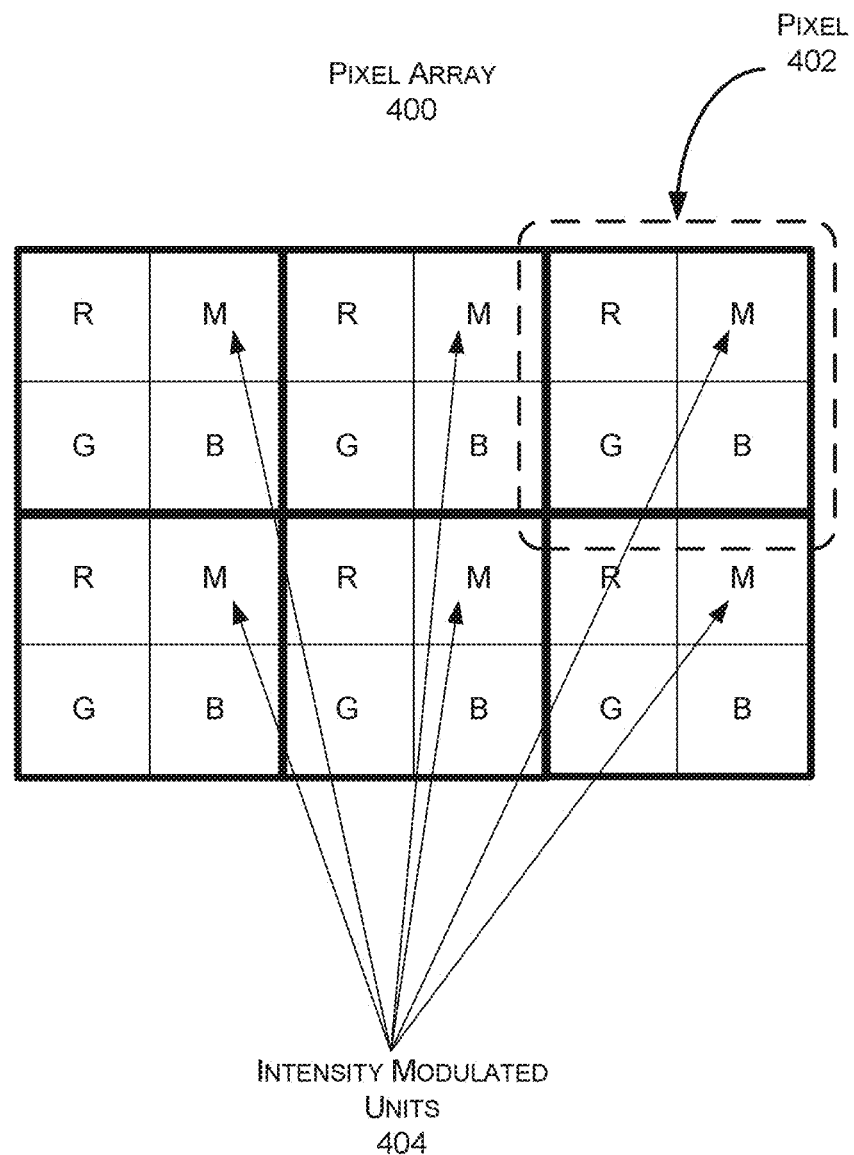
FIG. 4 shows another example device in which a light intensity modulator may be implemented for machine recognizable pattern generation.

FIG. 4 shows another example device in which a light intensity modulator may be implemented to generate machine recognizable pattern, all arranged in accordance with at least some embodiments described herein. As depicted, example pixel array 400 may include, at least, one or more pixels, e.g., pixel 402, and one or more intensity modulated units 404 correspondingly coupled to each of the pixels.

Pixel 402 may refer to a controllable element on a digital screen. Pixel 402 may include three subpixels that may respectively create red, green, and blue, and one of intensity modulated units 404 that may generate modulated visible light. In accordance conventional digital imaging technology, light generated by backlights in flat panel displays may be filtered by the three subpixels to generate red light, green light, and blue light respectively.

Intensity modulated units 404 may refer to one or more subpixels, each of which coupled to each pixel of pixel array 400. Similar to light intensity modulator 202, intensity modulated units 404 may be coated with multiple layers of anti-reflective or anti-refractive film to modulate the intensity of the visible light. Thus, by controlling the on-and-off status of intensity modulated units 404, a driver chip or a processor may accordingly control pixel array 400 to display machine recognizable pattern 208.

Figure 5:
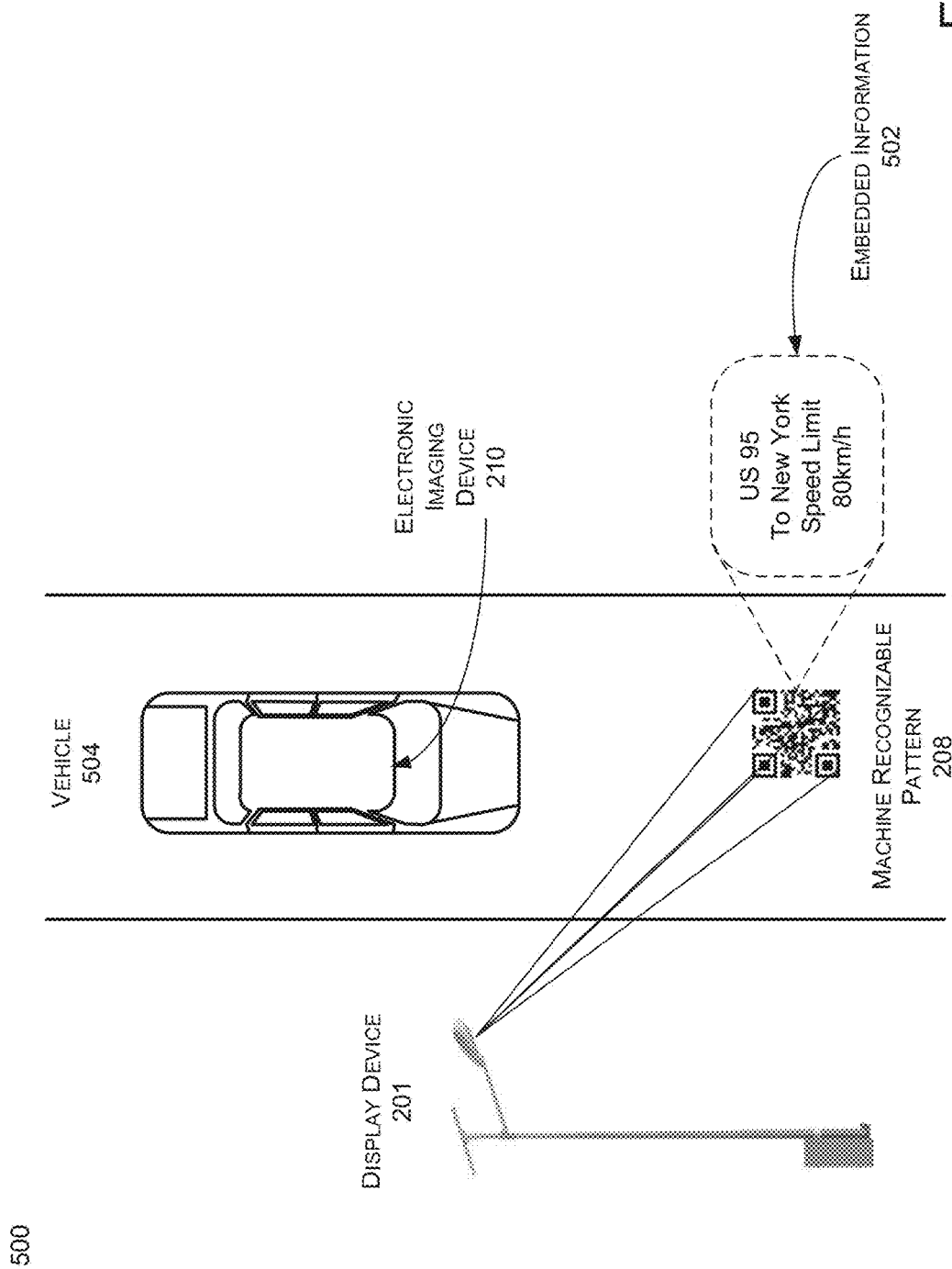
FIG. 5 shows an example system in which machine recognizable pattern generation may be implemented.

FIG. 5 shows an example system 500 in which machine recognizable pattern generation may be implemented, all arranged in accordance with at least some embodiments described herein. As depicted, example system 500 may include display device 201 that displays machine recognizable pattern 208 on a surface of a road. Machine recognizable pattern 208 may include embedded information 502 and may be captured by electronic imaging device 210 coupled to a vehicle 504.

As referenced herein, vehicle 504 may refer to any type of vehicle that may be operated by a driver. Non-limiting types or examples of such vehicles may include automobiles, autonomous vehicles, trucks, vans, golf carts, etc.

Display device 201 may refer to a device that may include light source 202 and light intensity modulator 204 as described above. In example system 500, light source 202 may refer to a street lamp in a public lighting system. Light intensity modulator 204 may refer to multiple layers of anti-reflective and/or anti-refractive film applied to a panel of transparent material that may be installed at, on, or near the street lamp. That is, machine recognizable pattern 208 may be printed on the panel of transparent material with the multiple layers of anti-reflective and/or anti-refractive film. When light source 202 is turned on, display device 201 may project machine recognizable pattern 208 on to the surface of the road. Since machine recognizable pattern 208 may be generated by the modulated visible light, machine recognizable pattern 208 may not be perceived by human eyes.

Embedded information 502 may refer to the information embedded in machine recognizable pattern 208. For example, embedded information 502 may include the identification of the road, e.g., US 95, the direction of the road, e.g., to New York, and speed limit, e.g., 80 km/h.

When electronic image device 210 captures machine recognizable pattern 208, embedded information 502 may be acknowledged by a processor coupled to vehicle 504. In accordance with different embodiments of vehicle 504, embedded information 502 may be presented to a driver of vehicle 504 or may be delivered to an autonomous driving system of vehicle 504 for reference.

Figure 6:
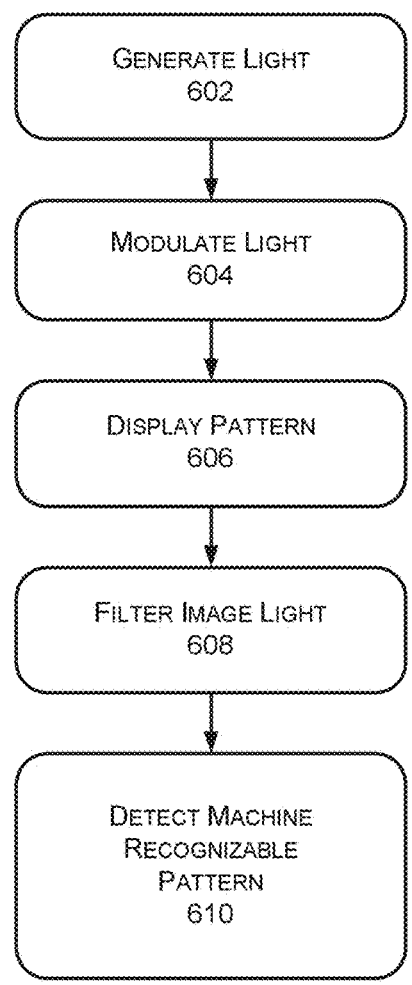
FIG. 6 shows an example configuration of a processing flow of operations by which machine recognizable patterns may be generated and detected.

FIG. 6 shows an example configuration of a processing flow of operations by which machine recognizable patterns may be generated and detected, all arranged in accordance with at least some embodiments described herein. As depicted, processing flow 600 may include processes executed by various components that are part of example system 200. However, processing flow 600 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 600 may include various operations, functions, or actions as illustrated by one or more of blocks 602, 604, 606, 608, and/or 610. Processing may begin at block 602.

Block 602 (Generate Light) may refer to light source 202 generating visible light, either white light or monochromatic light. In different examples of display device 201, light source 201 may refer to one or more backlights in flat panel displays, one or more light bulbs in projectors, and one or more LEDs in an LED display board. The generated visible light may be directed to light intensity modulator 204. Block 602 may be followed by block 604.

Block 604 (Modulate Light) may refer to light intensity modulator 204 modulating the intensity of the generated visible light. In at least some examples, light intensity modulator 204 may refer to one or more layers of anti-reflective and/or anti-refractive film applied to a lens coupled to light source 202. By applying multiple layers of anti-reflective and/or anti-refractive film on the lens, the visible light passing through the lens may be further modulated at multiple wavelengths. At each of the multiple wavelengths, a spectral peak is created due to the enhanced intensity. When two neighboring spectral peaks are close enough to each other, e.g., the spectrum separation between two neighboring spectral peaks being less than 80 nm, human eyes are unable to detect the difference between the visible light and the modulated visible light. The modulated visible light may then be utilized to form machine recognizable pattern 208. Block 604 may be followed by block 606.

Block 606 (Display Pattern) may refer to display device 201 displaying machine recognizable pattern 208, alone or in an image. In accordance with different embodiments of display device 201 as described above, machine recognizable pattern 208, alone or in the image, may be projected onto a screen or on a surface of a road, displayed on a flat panel display, or displayed on a LED display board. Block 606 may be followed by block 608.

Block 608 (Filter Image Light) may refer to electronic imaging device 210 filtering image light from the image using image spectral filter 218. That is, when image spectral filter 218 is applied with multiple layers of anti-reflective and/or anti-refractive film that are identical to the layers of film on light intensity modulator 204, the modulated visible light may pass through image spectral filter 218 and may be detected by image sensors 220. Block 608 may be followed by block 610.

Block 610 (Detect Machine Recognizable Pattern) may refer to image sensor analysis circuit 222 detecting machine recognizable pattern 208 by comparing the intensity detected via image spectral filter 218 to the intensities detected via blue filter 212, green filter 214, and red filter 216. In accordance with the result of the comparison, image sensor analysis circuit 222 may determine whether the modulated visible light or normal visible light is received at an array of sensing units included in electronic imaging device 210. Thus, machine recognizable pattern 208 may be detected by electronic imaging device 210.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
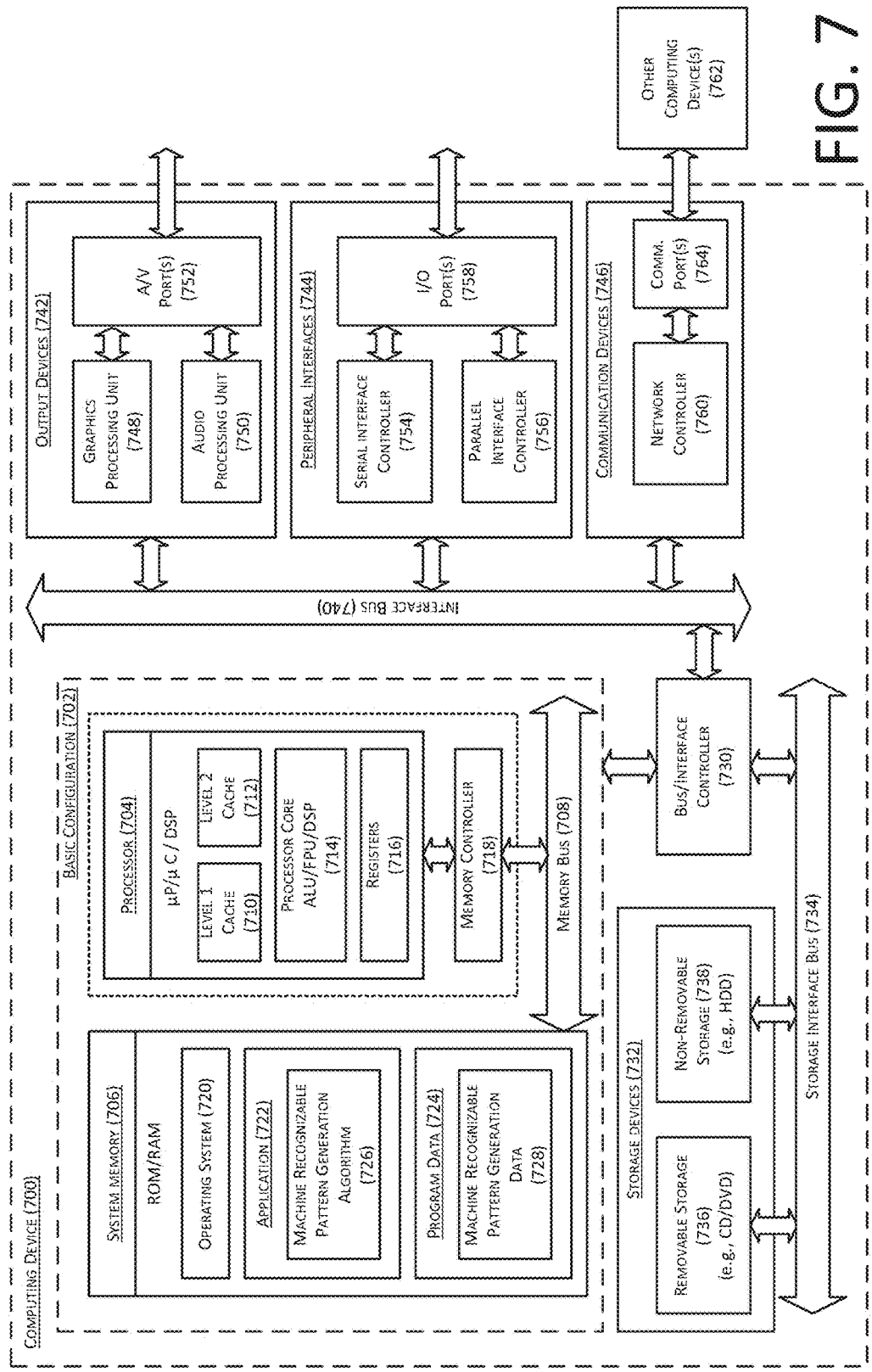
FIG. 7 shows a block diagram illustrating an example computing device that is arranged for machine recognizable pattern generation, all arranged in accordance with at least some embodiments described herein.

FIG. 7 shows a block diagram illustrating an example computing device that is arranged for machine recognizable pattern generation, all arranged in accordance with at least some embodiments described herein. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller (µC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a machine recognizable pattern generation algorithm 726 that is arranged to perform the functions as described herein including those described with respect to process 600 of FIG. 6. Program data 724 may include machine recognizable pattern generation data 728 that may be useful for operation with machine recognizable pattern generation algorithm 726 as is described herein. In some embodiments, application 722 may be arranged to operate with program data 724 on operating system 720 such that implementations of machine recognizable pattern generation may be provided as described herein. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

In some examples, a system for generating a machine recognizable pattern (for example, in an image) comprises a light source configured to emit light, and a light intensity modulator configured to create modulated light. The light intensity modulator may be a spectral modulator wherein the modulated light has a spectral modulation, such as an intensity modulation as a function of wavelength of the light. A spectral modulator may be configured to create a spectral modulation in light emitted from the light source, or in some examples may control the emission spectral properties and/or intensity of one or more light emissive elements in the light source. In some examples, the light intensity modulator may include an interferometric component that creates a periodic variation of light intensity as a function of wavelength, for example in a portion of the light spectrum. In some examples, a light intensity modulator may be configured to modify the spectral properties of a light source by providing electrical control signals to the light source to adjust the emission properties of the light source. In some examples, a light intensity modulator may be configured so that light from the light source passes through the spectral modulator, and the spectral modulation is introduced in to the light that has passed through the spectral modulator. In some examples, the light source includes one or more light emissive elements, for example a plurality of light emissive elements including first and second light emissive elements having different spectral emission properties, and the spectral properties of the light may be adjusted by adjusting electrical control signals provided to the first and second light emissive elements, for example to adjust the relative intensities thereof.

In some examples, the light source may include one or more light emitting diodes, and may include, for example, light emitting diodes of different spectral properties. In some examples, the light source may include one or more multicolor light emitting diodes. In some examples, the light source may comprise a display device, and switching of the display elements (e.g. emissive elements such as LED, OLED, other electroluminescent, plasma, and the like) and/or light valve elements (e.g. liquid crystal display pixels) may be used to achieve the spectral modulation.

In some examples, the light emitted by the light source may appear white (or other shade) to a person viewing the light, whether or not the spectral modulation is present in the light. The machine readable pattern may be encoded in the spectral modulation, and may be detectable by an electronic sensor, but may be imperceptible to a viewer. In some examples, a spectral modulation may slightly reduce the perceived intensity of the light, but not the perceived color, as perceived by a typical viewer. In some examples, spectral modulation may be achieved by adjusting the intensity, e.g. relative intensity, of one or more of the light emissive elements of the light source. In some examples, the spectral modulation may include a time-dependent spectral modulation, for example a spectral modulation in which the spectral modulation changes at a speed too fast to be perceived by a typical human eye.

In some examples, a system for generating a machine recognizable pattern (for example, in an image) may include a display device, configured to display an image using the modulated light. In some examples, a system may further include an electronic sensor, such as an electronic imaging device, configured to detect the machine recognizable pattern in the image. An electronic imaging device may be configured to collect image data related to the image, and detect the spectral modulation in the image data. The spectral modulation may not perceptible to a human viewer of the display device. In some examples, the spectral modulation may modify a visible portion of the light, and be imperceptible to a human viewer due to the wavelength separation of spectral modulation features being less than a perceptible value. In some examples, the wavelength separation of spectral modulation features such as adjacent peaks, may be less than 80 nm.

In some examples, a non-transitory computer-readable medium, which may be hosted by a service provider, is configured to store instructions that, when executed, cause one or more processors to perform operations comprising: generating visible light; selecting one or more wavelengths within at least a portion of a spectrum of the visible light, wherein a wavelength difference between consecutive selected wavelengths is less than a predetermined threshold value; modulating intensities of the visible light at the one or more selected wavelengths; and forming a pattern with the modulated visible light, wherein the pattern is substantially imperceptible, e.g. invisible, to human eyes. In some example computer-readable media, the modulating may comprise coating multiple layers of film on a transparent material to modulate the intensities of the visible light at the one or more wavelengths.

In some examples, modulating the light may comprise coating one or more (e.g. multiple) layers of film on one or more pixels to modulate the intensities of the visible light at the one or more wavelengths. In some examples, forming comprises generating a bar code or a quick response (OR) code with the modulated visible light. In some examples, operations may further comprise determining thicknesses of respective ones of the multiple layers of film based on the one or more wavelengths. Operations may further comprise coating one or more layers of second film on a filter of an image sensor, wherein the one or more second films are identical to the multiple films.

In some examples, a system for generating an image including a machine recognizable pattern comprises: a light source configured to emit light; a light intensity modulator configured to produce a spectral modulation of the light, and a display device configured to display the image using the light, wherein the machine recognizable pattern is encoded in the image by the spectral modulation. In some examples, the spectral modulation is not perceptible in the image by human vision. In some examples, the light passes through the light intensity modulator, and the spectral modulation is produced in the light that passes through the light intensity modulator. In some examples, the light intensity modulator may control the light source to produce the spectral modulation, for example by controlling modulation of light source elements. The light source may comprise a white light source, and/or a combination of light sources having different spectral emission properties. In some examples, a light intensity modulator may comprise a spectral filter configured to create the spectral modulation. A variation of the light intensity as a function of the wavelength may include a periodic variation, such as a periodic variation having a period of between 10 nm and 100 nm. A display device may comprise a projection display configured receive the light that passes through the light intensity modulator and display the image as a projected image.

In some examples, a light intensity modulator may be configured to create modulated light when the light passes through the light intensity modulator. In some examples, a light intensity modulator may configured to create modulated light when the light reflects from the light intensity modulator. In some examples, a light intensity modulator may configured to create modulated light by modification of the emission spectrum of the light source or light emissive elements thereof.

In some examples, the spectral modulation may not be perceptible to a human viewer. In some examples, the spectral modulation may not be perceptible as a change in color to a human viewer, but may be perceptible as a slight reduction in the overall intensity of an image. In some examples, a light source intensity may be increased to compensate for any losses arising from spectral modulation.

In some examples, a system for generating and detecting a machine recognizable pattern in an image comprises: a light source configured to emit light; a light intensity modulator configured to create modulated light, wherein the modulated light has a spectral modulation, and the spectral modulation includes an intensity modulation as a function of wavelength of the modulated light; a display device, configured to display an image using the modulated light; and an electronic imaging device, configured to detect the machine recognizable pattern in the image based on the spectral modulation. In some examples, a light intensity modulator may be configured to create modulated light when the light passes through the light intensity modulator. In some examples, the spectral modulation may not be perceptible to a human viewer of the display device. An electronic imaging device may include an image sensor and an image spectral filter, the image spectral filter having a spectral response matched with at least a portion of the spectral modulation. A system may further include an image augmenter, the image augmenter being configured to receive the machine recognizable pattern from the electronic imaging device, retrieve image augmentation information based on the machine recognizable pattern, and display the image augmentation information on the display. A display may be a television, portable computer display, mobile device display, or other electronic display.

In some examples, a system for detecting a machine recognizable pattern in an image comprises: an image spectral filter, configured to receive image light from the image and provide filtered image light; an optical sensor, configured to receive the filtered image light from the image spectral filter, and to generate sensor signals in response to the filtered image light; and an image sensor analysis circuit, configured to receive the sensor signals, and to detect the machine recognizable pattern in the image based on the sensor signals, wherein the machine recognizable pattern is a spectral modulation in the image light, the optical image filter is configured to enhance the spectral modulation in the filtered image light, and the spectral modulation is not perceptible to a human viewer of the image. The optical sensor may be an optical image sensor.

In some examples, the spectral modulation may include a wavelength-dependent modulation of the intensity of at least part of the spectrum of light, for example light generated by the light source and/or light emitted from the display. The spectral modulation may include intensity peaks and troughs, the peaks and troughs alternating as a function of wavelength. In some examples, the spectral modulation may be represented by a modulation function applied to an otherwise unmodulated spectrum. In some examples the spectral modulation may be a periodic function of wavelength, and the period (e.g. spectral separation of peaks separated by a single trough) may be in the range 1 nm-100 nm, such as 1 nm-80 nm.

In some examples, spectral modulation may be achieved using one or more of the following, electronic control of optical filters (such as electrically tunable interference filters), electronic tuning or intensity control of individual emission elements in a light source, interferometric elements (e.g. gratings, etalons and similar optical components) and the like.

In some examples, intensity modulation may be restricted to a portion of a displayed image. In some examples, the spectral separation between peaks may be increased beyond 80 nm, for example to 100 nm or 150 nm, particularly if the modulation is restricted to a portion of the display. In some examples, intensity modulation may be used as an anti-counterfeiting scheme. In some examples, spectral modulation may be used to encode data associated with a displayed image, for example to encode a URL from which additional data may be retrieved. In some examples, the spatial portions of the image in which spectral modulation is introduced may be used to represent a one or two dimensional bar code (such as OR code). In some examples, spectral modulation may be combined with time-dependent modulation of intensity, allowing additional data to be encoded. In some examples, time dependence of the spectral modulation may be used to encode data, e.g. an image that switches between modulated and less-modulated (or non-modulated) spectral properties.

In some examples, the machine recognizable pattern may be detected in the light by, for example, determining intensity ratios for two or more spectral wavelengths. An intensity ratio may be determined between a peak wavelength and a trough wavelength, as introduced by the spectral modulation. In some example, a particular wavelength ratio may be assigned to a logical ones and zeroes (e.g. for a significant intensity difference, as compared with no significant difference, or vice versa), and/or into an analog value. In some example, detection of spectral modulation may include intensity measurements at predetermined wavelengths. Measured intensities may be used to create intensity ratios that may be less sensitive to general intensity variations of the light source.

A non-colorblind human eye is capable of sensing three colors, red, green and blue, respectively. However, human eyes have limited ability in wavelength sampling. For example, light from a light source may have an unmodulated spectrum (y) of intensity vs. wavelength that may be represented by $y=f(\lambda)$. A modulation function may be applied to (e.g. superimposed) on the light, for example by a filter or otherwise, the modulation function having the form $\phi(\lambda)$. The modulated intensity (y') of the light may be of the form $y'=f(\lambda)+\phi(\lambda)$, where the modulation function $\phi(\lambda)$ may a periodic function of wavelength. In some cases, y' may be represented as a product of the modulation function and the unmodulated light spectrum. In some examples, the periodic function may be approximated by a sinusoid. When the period of a periodic modulation function (e.g. the wavelength difference between consecutive peaks) is short enough, the human eye cannot distinguish colors represented by y and y'.

In some examples, spectral modulation may be applied to a portion of the light spectrum, such as 500-600 m. In some examples, the portion of the spectrum may be selected as a relatively flat and/or stable portion of the light spectrum. Interference elements, such optical coatings, can be used to obtain a modulation function of the desired form. In some examples, optical coatings or other interference elements may include electrooptical materials, and may be electrically tunable to obtain a desired periodic function.

The bandwidths of wavelengths that are selectively allowed to pass through a filter, or be attenuated, can be controlled at a relatively precise level, for example on the order on nanometers or tens of nanometers. For example, using a multilayer coating or other technique, an optical filter may be able to modulate the light passing through with a desired spectral modulation. When such a filter is used in a projector, the white light projected by the projector, after modulation by the filter, can generate colors that are indistinguishable from unmodulated colors to human eyes, and the spectral modulation in images generated by such light cannot be perceived by human eyes.

Using a second optical filter with a similar modulation function to $\phi(\lambda)$, the presence of the spectral modulation can be detected. A photodetector used with such a second optical filter, such as a CCD, may then detect the signal of the spectral modulation. For example, a photodetector pixel may include four color filters, including conventional three colors plus a modulation function filter. Subtraction of the conventionally detected color data from that detected using the modulation function filter allows the modulated signal to be relatively isolated from the image data and successfully detected.

A liquid crystal display (LCD) may include the three conventional colors (e.g. red, green, and blue, RGB) and additionally one or more modulation function filters. The display may be used to display encoded data by allowing light to pass through the modulation function filter(s). In some examples, the encoded data may have a particular spatial distribution, for example in the form of a bar code.

In some examples, a light source such as an LED may include or otherwise be associated with a modulation function filter. An LED producing light with the spectral modulation may be used to produce machine-readable signals that are not perceptible to a human viewer.

In some examples, an object may be labelled using a film, for example formed using a coating method, such as an interferometric film. Example approaches include photoetching techniques, and metal film printing techniques. Labels with special colors (such as reflection and/or absorption properties including the desired spectral modulation) can be printed on an object surface. For example, a film coating may be formed on an object surface, wherein the film coating may reflect light with a reflectance spectrum including a spectral modulation. As with other examples, the spectral modulation may have a spatial distribution that encodes data, and/or encode data in the spectral modulation properties. Photoetching may be used to remove blank sections of the pattern from the coated film, and form patterns in the coated film, so that pattern printing can be used. Patterns (e.g. labels) may not by distinguishable from the background by a human eye, but may be recognized by machine recognition. Examples include labels, packaging, machine parts, consumer items, and the like, that support machine readable patterns that are not discernable by the human eye.

Machine recognizable patterns may include commonly used two-dimensional codes. These codes conventionally may degrade the appearance of an object. A spectral modulation may be used to display the two-dimensional code for machine recognition, while not degrading appearance of an object, packaging, advertising, and the like. The two-dimensional code can be captured when a user is using a mobile phone to take a picture of the object or a representation thereof (e.g. advertising or packaging), without degrading the visual impact of e.g. advertising. Spectral modulation may also be used on highway signposting, for example detectable by autonomous vehicles or vehicle sensors. Two-dimensional codes for machine recognition can also be printed by using a coating technique, for the convenience of self-driving cars, or any other equipment.

For example, a film coating (or other filter) and, optionally, a Fresnel lens can be placed on a vehicle lamp or road lighting lamp, and used to project a spectrally modulated light onto a surface, such as road surface, providing information for machine recognition. Analogous approaches can be used with outdoor advertising, indoor positioning, self-driving vehicles, and the like. Example applications further include digital watermarking for images or other visually represented data, such as movies.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure includes the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A system for generating a machine recognizable pattern, the system comprising:

a light source configured to emit light; and
a light intensity modulator, wherein the light intensity modulator comprises an optical filter configured to:
modulate intensities of the light at selected wavelengths within at least a portion of a spectrum of the light to provide a spectral modulation of the light that passes through the optical filter,
wherein a wavelength difference between consecutive selected wavelengths is less than a predetermined value, and
wherein the machine recognizable pattern is encoded by the spectral modulation of the light.

2. The system of claim 1, further comprising an image generator configured to receive the modulated light from the light intensity modulator and to form an image with the modulated light, wherein the image includes the machine recognizable pattern.

3. The system of claim 2, wherein the machine recognizable pattern is not visually discernable to a human viewer of the light or the image formed using the light.

4. The system of claim 1, wherein the optical filter comprises one or more pixels configured to modulate the intensities of the light at the selected wavelengths.

5. The system of claim 1, wherein the light includes visible light having a visible light spectrum from 390 nm to 700 nm.

6. The system of claim 1, wherein the machine recognizable pattern is a bar code or a quick response (QR) code.

7. The system of claim 1, further comprising an image sensor, wherein the image sensor is configured to:
receive the machine recognizable pattern through a filter, wherein the filter includes a second optical filter that is optically matched to the spectral modulation of the light.

8. The system of claim 1, wherein the machine recognizable pattern is a two-dimensional code.

9. The system of claim 1, wherein the light intensity modulator comprises a plurality of layers of anti-reflective film, anti-refractive film, or combinations thereof.

10. A method for generating a machine recognizable pattern, the method comprising:
generating light using a light source;
selecting wavelengths within at least a portion of a spectrum of the light, wherein a wavelength difference between consecutive selected wavelengths is less than a predetermined value;
modulating intensities of the light at the selected wavelengths, wherein the modulating comprises passing the light through a coating of multiple layers of a film on a transparent material; and
forming the machine recognizable pattern using the modulated light.

11. The method of claim 10, wherein the selecting the wavelengths within at least the portion of the spectrum of the light comprises selecting the wavelengths, wherein the wavelength difference between consecutive selected wavelengths is less than 80 nm.

12. The method of claim 10, wherein the forming the machine recognizable pattern comprises generating a bar code or a quick response (QR) code with the modulated light.

13. The method of claim 10, further comprising determining thicknesses of respective ones of the multiple layers of the film based on the selected wavelengths.

14. The method of claim 10, further comprising detecting the machine recognizable pattern using an image sensor, wherein the image sensor includes an optical filter having an optical response matched to the modulated intensities of the light at the selected wavelengths.

15. The method of claim 10, wherein the forming the machine recognizable pattern comprises forming the machine recognizable pattern on a surface of a road.

16. A system for generating an image including a machine recognizable pattern, the system comprising:
a light source configured to emit light;
a light intensity modulator, wherein the light intensity modulator includes a spectral filter configured to produce a spectral modulation of the light that passes through the light intensity modulator, wherein the spectral modulation includes a variation of light intensity as a function of wavelength; and
a display device configured to display the image using the light that passes through the light intensity modulator, wherein:
the machine recognizable pattern is encoded in the image by the spectral modulation, and
the spectral modulation is not perceptible in the image by human vision.

17. The system of claim 16, wherein the light source is a white light source.

18. The system of claim 16, wherein the variation of the light intensity as the function of the wavelength includes a periodic variation, wherein the periodic variation has a period of between 10 nm and 100 nm.

19. The system of claim 16, wherein the display device comprises a projection display configured to receive the light that passes through the light intensity modulator and display the image as a projected image.

20. A system for generating and detecting a machine recognizable pattern in an image, the system comprising:
a light source configured to emit light;
a light intensity modulator configured to create modulated light when the light passes through the light intensity modulator, wherein the modulated light has a spectral modulation, and the spectral modulation includes an intensity modulation as a function of wavelength of the modulated light;
a display device configured to display the image using the modulated light; and
an electronic imaging device configured to detect the machine recognizable pattern in the image based on the spectral modulation, wherein the electronic imaging device includes an image sensor and an image spectral filter, the image spectral filter having a spectral response matched with at least a portion of the spectral modulation,
wherein the spectral modulation is not perceptible to a human viewer of the display device.

21. The system of claim 20, further comprising an image augmenter, the image augmenter being configured to receive the machine recognizable pattern from the electronic imaging device, retrieve image augmentation information based on the machine recognizable pattern, and display the image augmentation information on the display device.

22. The system of claim 20, wherein the display device is a television, portable computer display, or mobile device display.

23. The system of claim 20, wherein the image sensor is configured to sense intensity of the light.

* * * * *